United States Patent
Henry et al.

(10) Patent No.: US 10,853,232 B2
(45) Date of Patent: Dec. 1, 2020

(54) ADAPTIVE SYSTEM FOR MOBILE DEVICE TESTING

(71) Applicant: Spirent Communications, Inc., San Jose, CA (US)

(72) Inventors: Evan C. Henry, Arlington, VA (US); Ian S. Becker, Frederick, MD (US); Robert R. Brown, Frederick, MD (US); Yuanke Wang, Frederick, MD (US)

(73) Assignee: Spirent Communications, Inc., San Jose, CA (US)

( * ) Notice: Subject to any disclaimer, the term of this patent is extended or adjusted under 35 U.S.C. 154(b) by 161 days.

(21) Appl. No.: 15/875,982

(22) Filed: Jan. 19, 2018

(65) Prior Publication Data

US 2019/0227917 A1 Jul. 25, 2019

(51) Int. Cl.
*G06F 11/00* (2006.01)
*G06F 11/36* (2006.01)

(52) U.S. Cl.
CPC ...... *G06F 11/3692* (2013.01); *G06F 11/3664* (2013.01); *G06F 11/3684* (2013.01); *G06F 11/3688* (2013.01)

(58) Field of Classification Search
CPC ............. G06F 11/0706; G06F 11/0718; G06F 11/3612; G06F 11/3668; G06F 11/3688; G06F 11/004; G06F 11/0751; G06F 2201/87; G06F 11/3636; G06F 11/366; G06F 11/3672
USPC ............................................... 714/38.1, 47.1
See application file for complete search history.

(56) References Cited

U.S. PATENT DOCUMENTS

| | | |
|---|---|---|
| 6,502,102 B1 | 12/2002 | Haswell et al. |
| 6,907,546 B1 | 6/2005 | Haswell et al. |
| 8,436,829 B1 | 5/2013 | Zhai et al. |

(Continued)

OTHER PUBLICATIONS

Android Debug Bridge, Android Developers Testing Support Library, 11 pages, accessed Mar. 2, 2016 [http://developer.android.com/tools/help/adb.html[Feb. 2, 2016=5:17:15 PM].
Testing Concepts, Android Developers Testing Support Library. 7 pages, accessed Mar. 2, 2016 [http://developer.android.com/tools/testing/testing_android.html[Feb. 2, 2016 6:00:39 PM] ].
Testing Support Library, Android Developers Testing Support Library. 9 pages, accessed Mar. 2, 2016 [http://developer.android.com/tools/testing-support-library/index.html[Feb. 2, 2016 6:26:15 PM] ].

(Continued)

*Primary Examiner* — Sarai E Butler
(74) *Attorney, Agent, or Firm* — Haynes Beffel & Wolfeld LLP; Ernest J. Beffel, Jr.; Andrew L. Dunlap (57) ABSTRACT

Systems, methods, and devices for creating a test performance monitoring and reporting system that is adaptive for use with different types of mobile devices are disclosed. The test performance monitoring and reporting system adapts itself to be interoperable with different models of mobile device by combining sequences of deterministic logic blocks with device-specific asset libraries. Logic blocks can be added to or removed from the sequence. Logic blocks implement different operations of mobile devices, including using assets, launching applications, and replaying sequences of command interface interactions recorded from test users. The asset library contains assets corresponding to mobile device elements that can be manipulated by users. These assets are device-specific, and a test script can be adapted to fit a particular mobile device model by replacing the existing assets in the script with assets from the asset library of the particular mobile device.

20 Claims, 8 Drawing Sheets

(56) References Cited

U.S. PATENT DOCUMENTS

| | | | | |
|---|---|---|---|---|
| 8,650,489 | B1* | 2/2014 | Baum | G06F 16/78 715/723 |
| 9,990,110 | B1 | 6/2018 | Lounibos et al. | |
| 2003/0037289 | A1* | 2/2003 | Singh | G06F 11/0715 714/38.12 |
| 2005/0086557 | A1* | 4/2005 | Sato | G06F 11/008 714/6.12 |
| 2011/0251819 | A1* | 10/2011 | Ong | G01R 31/31725 702/120 |
| 2013/0287305 | A1* | 10/2013 | Dhanda | G06F 16/958 382/218 |
| 2014/0045483 | A1 | 2/2014 | Whidden | |
| 2014/0132571 | A1 | 5/2014 | Zeng et al. | |
| 2015/0161386 | A1* | 6/2015 | Gupta | G06F 11/3612 726/23 |
| 2015/0207676 | A1* | 7/2015 | Kuokkanen | H04L 41/0803 709/220 |
| 2015/0327022 | A1* | 11/2015 | Lin | H04W 40/244 455/456.1 |
| 2015/0370680 | A1 | 12/2015 | Chiang | |
| 2016/0028845 | A1* | 1/2016 | Barr | G06F 11/0751 714/37 |
| 2017/0262130 | A1 | 9/2017 | Lloyd et al. | |
| 2018/0084047 | A1* | 3/2018 | Hao | H04L 43/50 |
| 2018/0089071 | A1* | 3/2018 | Keskitalo | G06F 11/3692 |
| 2018/0246626 | A1* | 8/2018 | Lounibos | G06F 3/0484 |
| 2018/0343574 | A1* | 11/2018 | Basedahl | G06F 11/3688 |
| 2018/0358313 | A1* | 12/2018 | Newman | G06F 13/4095 |
| 2018/0365133 | A1* | 12/2018 | Mitchell | G06F 11/3664 |
| 2019/0206390 | A1* | 7/2019 | Rotem | G06N 3/0445 |
| 2019/0227917 | A1 | 7/2019 | Henry et al. | |

OTHER PUBLICATIONS

Android Developers, ADB Shell Commands, 12 pages, accessed Nov. 11, 2015 (http://developer.android.com/tools/help/shell.html#shellcommands).

Android Developers, Android Interprocess Communication (IPC) with Messenger (Remote Bound Services) | Code Theory, 6 pages, accessed Nov. 11, 2015 (http://codetheory.in/android-interprocess-communication-ipc-messenger-remote-bound-services/).

Android Developers, Monkeyrunner, 7 pages, accessed Nov. 11, 2015 at (http://developer.android.com/tools/help/monkeyrunner concepts.html).

Android Developers, Using DDMS, 7 pages, accessed Nov. 11, 2015 at (http://developer.android.com/tools/debugging/ddms.html).

Remote Input shell scripts for your Android Device, or my screen is cracked. 4 pages, accessed Nov. 11, 2015 at (https://grymoire.wordpress.com/2014/09/17/remote-input-shell-scripts-for-your-android-device/).

U.S. Appl. No. 15/456,331—Non-final Office Action dated Oct. 4, 2018, 26 pages.

Kobayashi et al, Android debug Bridge: how it work?, 2012. 36 pages.

U.S. Appl. No. 15/456,331—Response to Non-final Office Action dated Aug. 13, 2019 filed Dec. 9, 2019, 16 pages.

U.S. Appl. No. 15/456,331—Response to Non-final Office Action dated Oct. 4, 2018 filed Apr. 4, 2019, 13 pages.

Gomez et al, "RERAN: Timing- and Touch-Sensitive Record and Replay for Android", 2013, 10 pages.

U.S. Appl. No. 15/456,331—Non-final Office Action dated Aug. 13, 2019, 33 pages.

U.S. Appl. No. 15/456,331—Final Office Action dated Mar. 19, 2020, 45 pages.

* cited by examiner

Fig. 6

ADAPTIVE SYSTEM FOR MOBILE DEVICE TESTING

RELATED APPLICATION

This application is related to U.S. patent application Ser. No. 15/456,331, entitled "PERFORMANCE TEST APPLICATION SEQUENCE SCRIPT", filed Mar. 10, 2017, which application is hereby incorporated by reference.

FIELD OF THE INVENTION

The present invention generally relates to systems, methods and devices for creating and running tests of touchscreen devices to evaluate various device performance parameters.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Mobile devices connected to cellular networks need to be tested during development, for carrier acceptance, and to measure performance. This includes testing against live websites that process touch events. Testing is performed by writing or programming scripts and executing these scripts on mobile devices using testing systems such as mobile device emulators. Live websites present themselves differently on different device versions over time. Different devices have different ways of representing elements and features of these live websites. This makes consistent testing of mobile devices difficult.

An opportunity arises to provide a flexible test protocol that can accommodate different presentations of a live website. More consistent, easily maintained and easily applied tests can result.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EXAMPLES

The following detailed description is made with reference to the figures. Sample implementations are described to illustrate the technology disclosed, not to limit its scope, which is defined by the claims. Those of ordinary skill in the art will recognize a variety of equivalent variations on the description that follows.

As used herein, the term touchscreen device refers to any device using a touch sensor capable of detecting the coordinates of a touch on the sensor, such as a smartphone, a tablet, or an eBook.

It is necessary to test applications on mobile devices using scripts in order to benchmark the devices and provide mobile carriers with information allowing the carriers to decide which devices to support. Although many types of mobile devices run applications using the same open source platform, applications differ in how they operate on different devices, making it difficult to write test scripts. For example, a play action on a video-sharing application used by two different devices is be triggered by clicking a different icon on respective devices. Additionally, the same application operation on each device may require a different sequence of commands to be input by a user. Writing test scripts that are capable of adequately testing a variety of mobile devices is cumbersome, as text commands must be added, removed, or reordered each time a new device is to be tested.

In addition, it is difficult to write a script that accounts for divergent paths of test execution. Rigorous testing of a device may require accounting for multiple outcomes that arise after each command of a test script is executed. In a text-based script, listing the possible outcomes after each executed command may not be intuitive. In addition, each successive outcome may have its own subset of branching outcomes that need to be tested. The technology disclosed is a service that allows testers to easily account for operational differences and branching outcomes and would be preferable for testers over text-based scripting methods.

The disclosed mobile test performance monitoring and reporting system confers two major advantages over text-based scripting methods. The first advantage is the use of asset libraries to account for different presentations of command interfaces presented to different types of mobile devices. An asset is an image of a control element of an application with which a mobile user interacts. Assets are referenced from logic blocks in the script. When the test performance monitoring and reporting service script reaches a block containing an asset, it locates the control element associated with the asset on the mobile device screen so that it can manipulate the control. For example, an asset may be an image of a "Play" button that begins playback of a media file, or an image of a "Call" button that dials the telephone number of another mobile user. On different mobile devices, even those that run the same platform, these assets may be represented by different icons. Examples of icons that the reader may recognize as differing across mobile device types include application play buttons, search bars, application launch icons, call buttons, and "End Call" buttons. Therefore, these assets are device-specific. The disclosed mobile test performance monitoring and reporting system maintains a library of assets for each type of device. These assets are loaded into the asset library of a specific device when the device is connected. Assets may be recognized by the test performance monitoring and reporting system using different types of image recognition techniques.

Using the asset library makes it easier to adapt a script using these logical blocks. When a new device is added, assets that are executed by the logical blocks are changed to assets within the library specific to the device that was added. If a given sequence of commands results in an error, the command sequence is recorded so that it can be modified by the user testing the new device.

The second advantage conferred by the disclosed mobile test performance monitoring and reporting system is the use of deterministic logic blocks. These logic blocks represent different actions that are executed by the mobile device. The blocks can be displayed in a graphical user interface as nodes, in some embodiments. Different blocks can be added or removed based on the varying command interfaces of the devices used. For example, different logic blocks may include actions such as waiting or executing applications or application features. Executing a logical block may result in one of a set of outcomes depending on the context in which the block is executed and parameters associated with the logical block. In these cases, branching logical blocks are added to the script and connected to the logical block capable of producing multiple outcomes. Conditional statements are employed to choose one among these multiple outcomes.

Figure 1A:
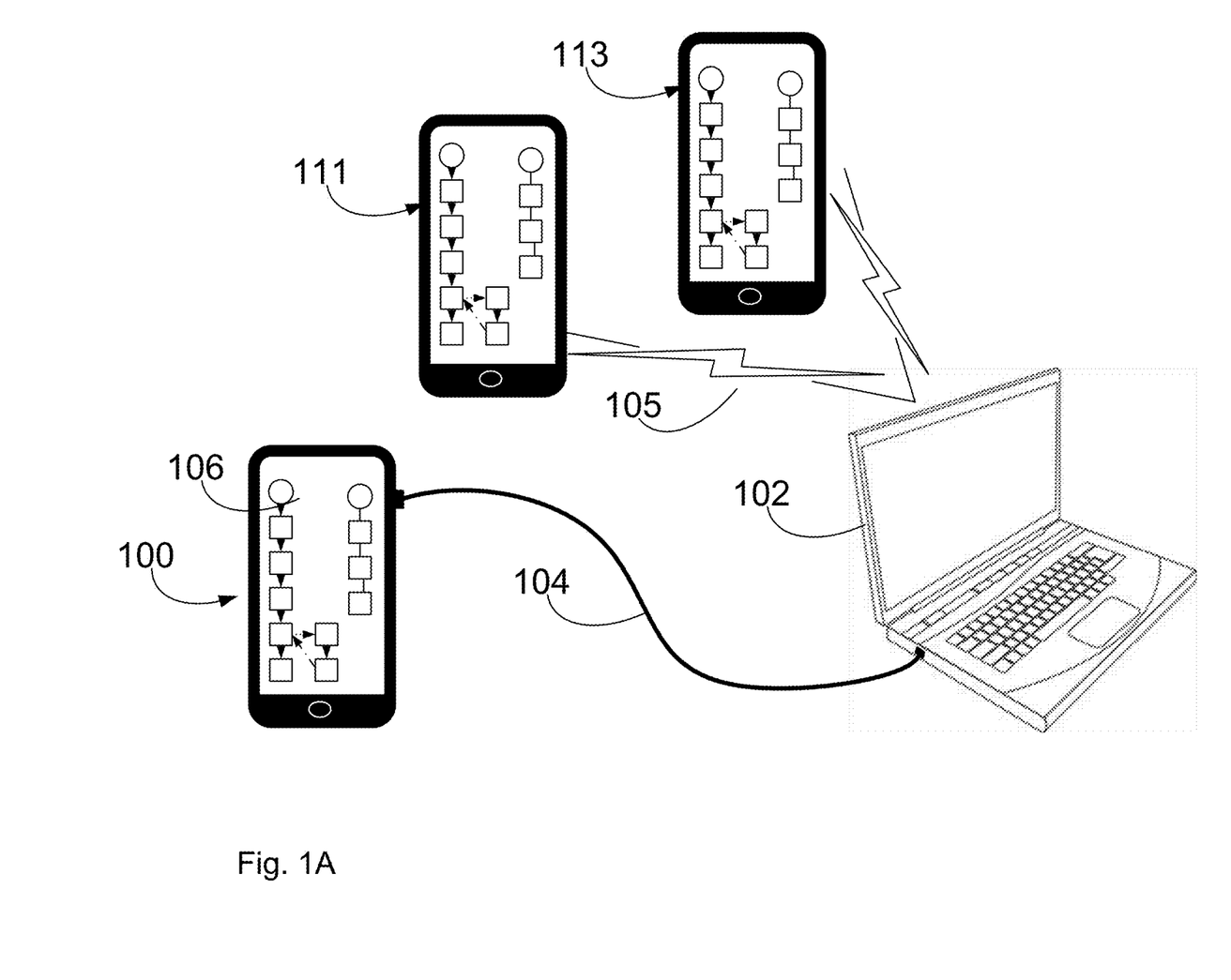
FIG. 1A is an illustration of mobile devices connected to a remote machine.

FIG. 1A shows a mobile device 100 connected to a remote machine 102, also referred to herein as a PC, with a USB connection 104. The mobile device 100 is a computer system including a touchscreen display 106, a processor, a memory, and a plurality I/O ports (e.g. USB, Wi-Fi, headphone jack). The touchscreen display 106 is capable of detecting user touch input, for example touching the screen with a finger or a stylus. The user touch input may be processed as a tap, swipe, or gesture. The touchscreen display 106 is configured to allow a user to create, edit, and execute test scripts using a test performance monitoring and reporting system. For example, an application processes user touch input to manipulate onscreen elements in a drag-and-drop interface in order to edit a script. The remote machine 102 is a computer system configured to run a command line tool, script processor or GUI that allows for communication with the mobile device through the USB connection 104 or through a wireless (Wi-Fi, WiMAX, DECT, Zigby, Bluetooth, etc.) connection 105. For example, the command line tool can be the Android Debug Bridge (ADB), connected by USB to the mobile device runs the Android operating system.

Under normal operation, the Android operating system on the mobile device does not give a first application permission to send or receive events, such as screen touch events, to a second application, sometime referred to as inter-process communications. Instead, the system stack is ordinarily the source of all system events including screen touch events. Other mobile operating systems are similarly secured. However, with an ADB connection initiated through a USB connection, permissions are elevated to allow instructions or simulated system events to be communicated from a heightened permissions program (HPP) running on the mobile device to other programs also running on the mobile device. In one ADB configuration, a user at the PC invokes a client ADB command line tool on the PC. An ADB server host, also on the PC, establishes a connection to a daemon that runs as a background process on the mobile device. The user enters commands or runs a script representing primitive events to be emulated on the connected Android device. In another configuration, an Android class MonkeyRunner is used with related classes to write a program driven test. Example events that can be sent to the client are screen touch and screen drag events or simulated text input. In these configurations, the USB connection is a physical security requirement, a prerequisite to elevating permissions to allow extended inter-process communications. Further security may be provided by requiring matching keys on the PC and mobile device, which tie the mobile device to the PC from which the debug component was installed. Elevated permissions allow applications running on the device to send and receive events to or from other applications running on the device. The elevated permissions are necessary for a test application, for instance, to generate screen touch events for processing, as if a user were pressing on the mobile device's display.

With a command line tool, such as the ADB, or a program interface, permissions are available to allow a developer to record touch events occurring while running an application, as well as simulate touch events to be processed by an application running on the device. For example, on the remote machine 102 a technician can use a command line tool to send, over the USB connection 104, a command to the mobile device 100 to simulate a tap at coordinate (34, 49) on the screen of the device. In this scenario, the ADB command line tool simulates this tap on the mobile device and an application running on the device processes the tap as if the screen of the device were tapped at coordinates (34, 49) by a finger or a stylus. Using the ADB in this way has the disadvantage that the permissions are only given by the ADB when the physical security requirement is met, for example a wired connection of the device with a remote machine running the ADB. In the present technology, the problem is solved by sending and running on the device a heightened permission program, herein after "HPP", while the physical security requirement is met and the remote machine running the ADB is connected. While connected, the ADB gives permissions to the HPP to send and receive commands to or from other applications running on the device. The HPP maintains the heightened permission level of the ADB after the physical security requirement connection between the remote machine and the mobile device is disconnected.

In one embodiment, the remote machine 102 is a lightweight, portable device such as a RASPBERRY PI®. Such a device is cheap, compact and standalone. The lightweight device optionally is dedicated device launching the HPP on the mobile device. In this embodiment, the HPP is started automatically on the mobile device 100 when the ADB is connected via USB. In this embodiment, a time-based job scheduler prompts the remote machine 102 to automatically start the test monitoring and reporting system on the mobile device 100.

The HPP, with the permissions granted thereto from the initial ADB physical security connection, can be utilized in both recording and replaying touch event sequences as will be described below.

Figure 1B:
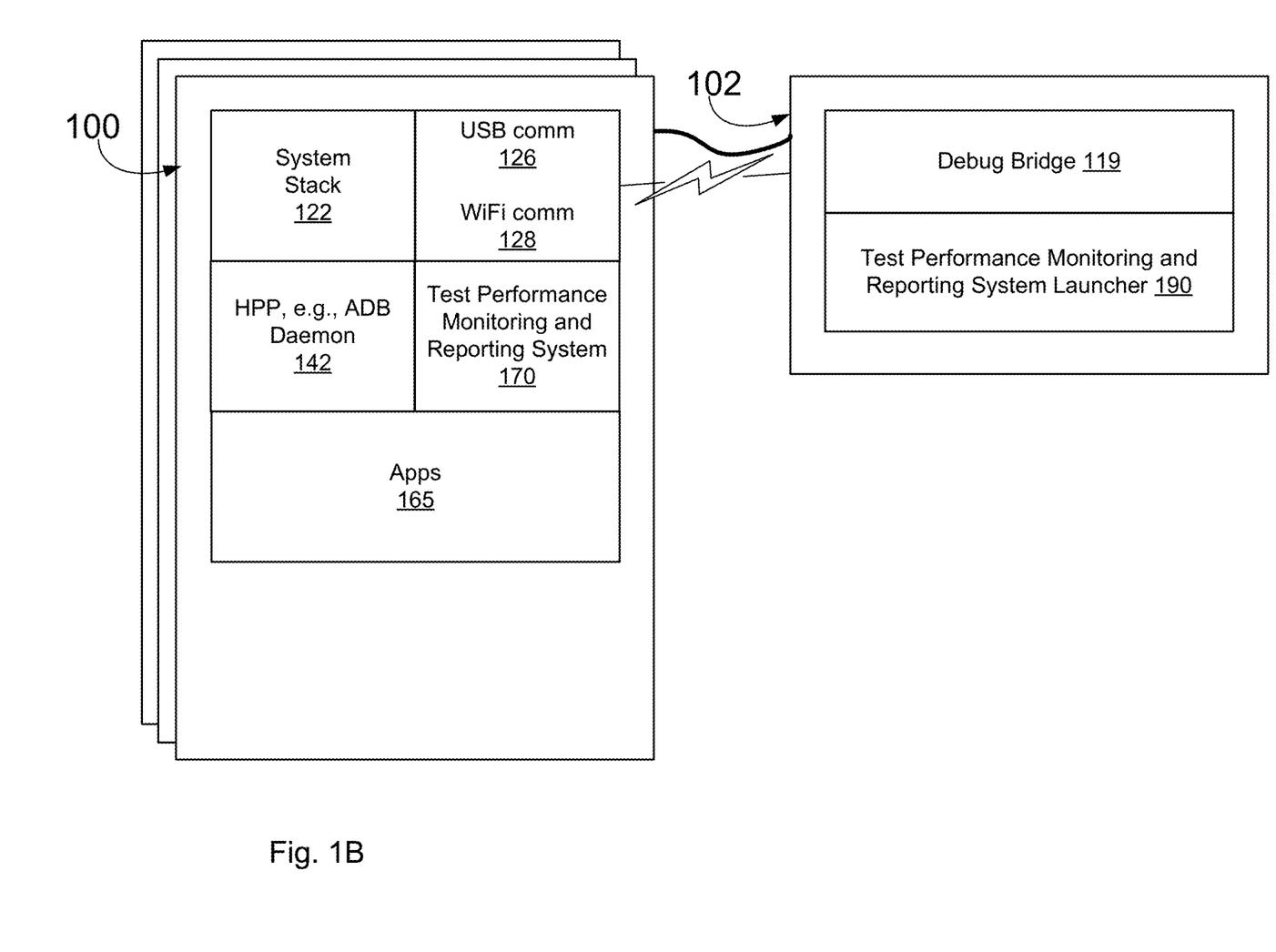
FIG. 1B is a high-level software component block diagram of a mobile device under test and a test controller.

FIG. 1B is a high-level software component block diagram of a mobile device under test 100 and a test controller 102. On the mobile device 100, a system stack 122, debug daemon 142, apps 165 and test performance monitoring and reporting system 170 run. The system stack 122 provides low level functions, including system security and communications. The communications channels illustrated are USB communications 126 and Wi-Fi communications 128. Of course, additional channels such as Bluetooth are likely to be present. Not illustrated is the system stack for the touch screen.

The test performance monitoring and reporting system 170 allows a user of the mobile device 100 to create and run scripts to test features of the mobile device 100. The scripts are created by sequencing and connecting logic blocks. The test performance monitoring and reporting system 170 is further described in the description of FIG. 1C.

The debug daemon 142 utilizes heightened permissions or privileges to allow the test performance monitoring and reporting system 170 to create, edit, and execute scripts on the mobile device 100. In this embodiment, the daemon is the ADB. The daemon 142 also could communicate directly with the App 165, to obtain internal data. In one example, a test is performed by daemon interaction with the system stack, to generate touch events and to detect screen events resulting from the touches. The daemon also may interact with the system stack and/or the app to detect status changes in the system, either from events that change the system status or by watching variables or registers that reflect status. The debug daemon can receive data generated on the mobile device 100 and send it back to the ADB server or to a test console that interacts with or emulates the ADB server/client pair on the PC 102.

The daemon 142 can inform the test performance monitoring and reporting system 170 of status changes in order for the test performance monitoring and reporting system 170 to transition between logical blocks. For example, the test performance monitoring and reporting system 170 can use internal data received from an app 165 to determine a condition in which to perform a specific action. The test performance monitoring and reporting system 170 can also communicate with the debug daemon 142 to perform tests that require data reported from captured or simulated touch events.

The daemon 142 includes a capture program that allows the testing user to take screenshots of whole and cropped screen images of onscreen events that take place during a test. These screenshots can be used by the test performance monitoring and reporting system 170 to update logic blocks. For example, screenshot data can be scanned for the presence of an onscreen element that is necessary in order to execute a particular logic block. Different mobile devices may have different elements that may be used to execute the same logic block (for example, two mobile devices may have different "End Call" icons). These different elements may be captured using screenshots and substituted for one another when tests are adapted to different mobile devices.

Both wired and wireless connections between the mobile device under test 100 and a test controller 102 are illustrated in FIG. 1B.

On the test controller 102, a debug bridge 119 and test performance monitoring and reporting system launcher 190 are illustrated. This organization of program parts is illustrative. In practice, fewer or additional components can be used to implement the features described. The debug bridge 119 launches the HPP on the mobile device 100. In one example, the debug bridge 119 is the ADB host, which interacts with a special purpose HPP client 142, such as a daemon, running on the mobile device 100. The test performance monitoring and reporting system launcher 190 launches the HPP on the mobile device 100. It instructs the mobile device 100 to launch the test performance monitoring and reporting system 170 after the HPP is running on the mobile device. The test performance monitoring and reporting system launcher 190 can launch the test performance monitoring and reporting system 170 on multiple mobile devices that will run tests in parallel.

Figure 1C:
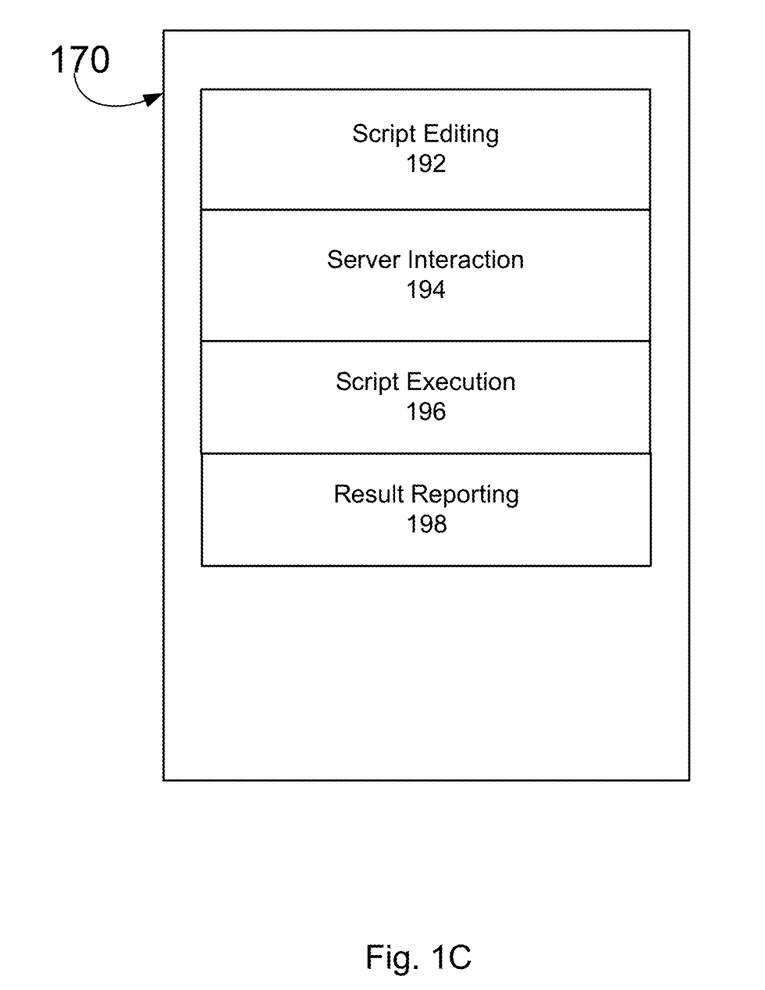
FIG. 1C illustrates components of the test performance monitoring and reporting system on the mobile device.

FIG. 1C illustrates components of the test performance monitoring and reporting system 170 on the mobile device 100. The test performance monitoring and reporting system 170 contains a script editing component 192, a server interaction component 194, a script execution component 196, and a result reporting component 198. In some embodiments, the script editing component, script execution component, and results reporting components are located on the test controller 102. In addition, scripts may also be stored on the test controller 102 and downloaded to mobile devices 100, 111 and 113 as they are connected. The debug bridge 119 transfers data, scripts, programs, etc. between the controller and the mobile device.

The script editing component 192 allows the user of the test performance monitoring and reporting system 170 to create and edit scripts that can be executed by the mobile device 100. The test performance monitoring and reporting system 170 represents scripts as sequences of logic blocks that can be added, removed, connected, and rearranged. Individual logic blocks may execute an action or prompt the user to perform an action. In some cases, logic blocks use conditional branching to cause the mobile device 100 to perform different actions depending on input conditions or actions. For example, a script may prompt a user to tap an onscreen element if the element exists in an expected location on the screen, but will not prompt the user to take action if the element does not exist or is not in the expected position.

The server interaction component 194 allows the test performance monitoring and reporting system 170 to interact with a script storage server. The script storage server may be, for example, a cloud-hosted repository. Scripts created using the test performance monitoring and reporting system 170 on a mobile device can be uploaded to the script storage server via an in-application dialog. Scripts already loaded onto the script storage server can be loaded onto the mobile device using the server interaction component 194 and edited by the script editing component 192.

The script execution component 196 runs the script on the mobile device being tested. The logic blocks are arranged in a sequence using directional elements, such as one-way arrows. The script executes each logic block individually in sequence. The script can only be run after the debug bridge 119 has launched the HPP on the device. The testing user can stop runtime of the script before the script has completed execution. The script can also be configured to provide the testing user with notifications during runtime, to allow the user to have more information about the executions of individual logic blocks in the script. The script execution component 196 can also superimpose graphical locations of manual or simulated touch events on a recorded video, in order for the testing user to have a visual record of touch events taking place during script execution.

The result reporting component 198 may present the testing user with a screenshot of a terminal node in the script. If the testing user is debugging the script, the results reporting component 198 may provide the testing user with a timestamp at which the test script failed in addition to a screenshot of the node at which the test failed. The result reporting component 198 can show the user an image showing an expected screen view as a result of executing the node, so that the testing user can compare the expected node to the screenshot taken while the test was being executed.

The result reporting component may present the testing user with a video of the running script.

The result reporting component 198 also provides the testing user with an export comma-separated value (CSV) file that reports key performance indicators (KPIs). These KPIs include location information, phone information, telephony bearer information, data bearer information, cellular radio access technology (RAT) information, carrier, mobile country code (MCC), and mobile network code (MNC), the amount of data bytes sent and received, and device maintenance information. The location information includes GPS latitude and longitude coordinates, GPS satellite pseudorandom noise (PRN) and signal-to-noise ratio (SNR) information, and Wi-Fi parameters including the service set identifier (SSID), basic service set identification (BSSID), received signal strength indicator, and evolved absolute radio frequency channel number (EARFCN). The phone information includes the phone number, international mobile equipment identity, and cellular RSSI.

Figure 2A:
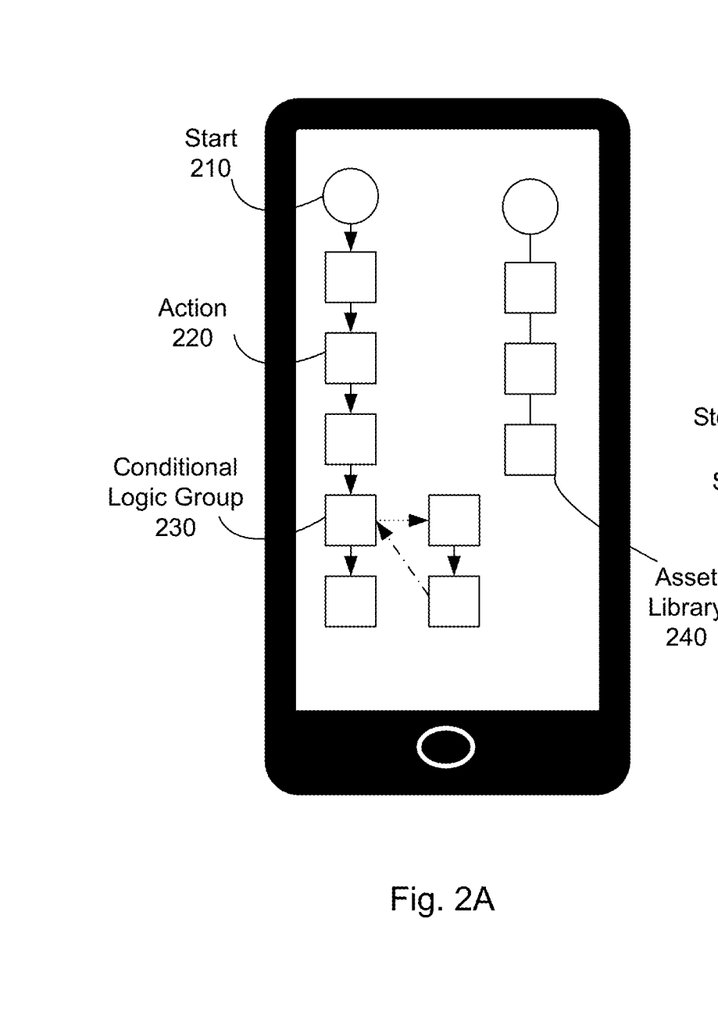
FIG. 2A shows an illustration of an embodiment of the test performance monitoring and reporting system running on a mobile device.

FIG. 2A shows an illustration of an embodiment of the test performance monitoring and reporting system running on a mobile device. Referring to FIG. 2A, a mobile device is illustrated, running a test performance monitoring and reporting system comprising a graphical sequence of logical blocks. These include a start block 210, an action block 220, a conditional set of blocks 230, and an asset library 240. Blocks may be grouped into sections for indexing purposes. In this embodiment, blocks are sequenced and connected using directional arrows. This structure ensures that the same sequence of steps will be taken each time a script is run. Therefore, for a given set of inputs, the test performance and monitoring system is expected to report the same result each time a script is run. Blocks can be removed or reordered.

The start block 210 signifies the beginning of the script. In this embodiment, the start block 210 is designated using a circular button. The start block 210 is automatically placed in the script by the editor when a new script is created and cannot be deleted.

The action block 220 is used to implement one or more operations. One operation is launching an application. For example, an Android application can be launched by invoking the am start command, followed by the package name of the component to be launched. Some exemplary applications include GOOGLE® Play, GOOGLE® Chrome, and YOUTUBE®. Another operation that can be added is simulating a touch event. This action may include, for example, tapping an element on the screen or inputting a string of text into a text object on screen. Actions such as these cause the script to proceed to the next logic block. Another action is the "Wait" action, where the script pauses for a user-determined portion of time before executing the next action in the sequence. Action blocks also may direct the mobile device's browser application to open a webpage associated with a specific URL. In some embodiments, action blocks are configured to allow for a timeout period to occur to allow the action to either take place or fail.

Some logical blocks trigger different actions in response to different input parameters. For example, a logical block triggers one type of action in the presence of a Wi-Fi network and another type of action in the absence of a Wi-Fi network. Conditional branching is employed to account for these outcomes. The conditional logic group 230 shows how conditional branching is employed. A single logic block, or node, may have multiple directional connections to other nodes. In one embodiment, one of these connections is a positive connection and the other connection is a negative connection. Conditional branching can also be employed to account for multiple types of assets that may be presented when a logic block is executed. For example, a user could be prompted to perform remedial actions on encountered types of assets until a desired asset is encountered.

The asset library 240 contains a set of assets unique to the device being tested. In this embodiment, the asset library 240 is located on the right-hand side of the screen of the mobile device. The asset library 240 includes a list of images representing onscreen elements presented to the user of the mobile device. For example, one type of asset is an image of a play button used by that specific mobile device to toggle playback of media content. Other assets include images of clickable media items, call buttons, and search bars. The asset library 240 is expressed within the test performance monitoring and reporting system as a connected sequence of logic blocks associated with each of the assets in the asset library.

An asset that is an onscreen image element can be swapped for another onscreen image that is at a different location than that of the first onscreen image. For example, a user can select an asset within the asset library and open a screenshot containing a bounding box showing the location of the asset onscreen. The user can change the location of this bounding box in order for it to surround a different onscreen element. This can be done to quickly update the asset library 240.

When a type of mobile device that has not been previously tested is connected, the asset library of the test performance monitoring and reporting system can be updated. Each script stores a generic set of assets that are used in the script, as well as asset libraries that have been loaded for mobile devices that have been tested with the script. In one embodiment, the generic set of assets and device-specific asset libraries are stored on the script storage server in a cloud-based repository. A testing user can load any asset library stored on the cloud when testing any device. The generic asset library is derived from the first mobile device tested by the test performance monitoring and reporting system. Subsequent mobile device asset libraries are cloned from the generic asset library, with individual generic assets swapped for device-specific assets as needed.

In one embodiment, the test performance monitoring and reporting system allows the user to employ a training mode to take screenshots of assets and populate the asset library. Training mode executes each node in the asset library sequentially until a node containing an asset that does not exist on the particular device is found. A screenshot is captured and the user is prompted to replace the existing asset in the asset library by selecting the element on the screenshot corresponding to the asset of the device currently being tested. This asset is then added to the asset library 240.

If an untested mobile device is executing a script that was written for another device, that script may not be able to locate a corresponding asset in the location where it expects to see the asset. The script is then updated using conditional branching to account for the different sequence of commands that need to be executed to reveal the expected asset. This process is described further in the description of FIG. 4.

Figure 2B:
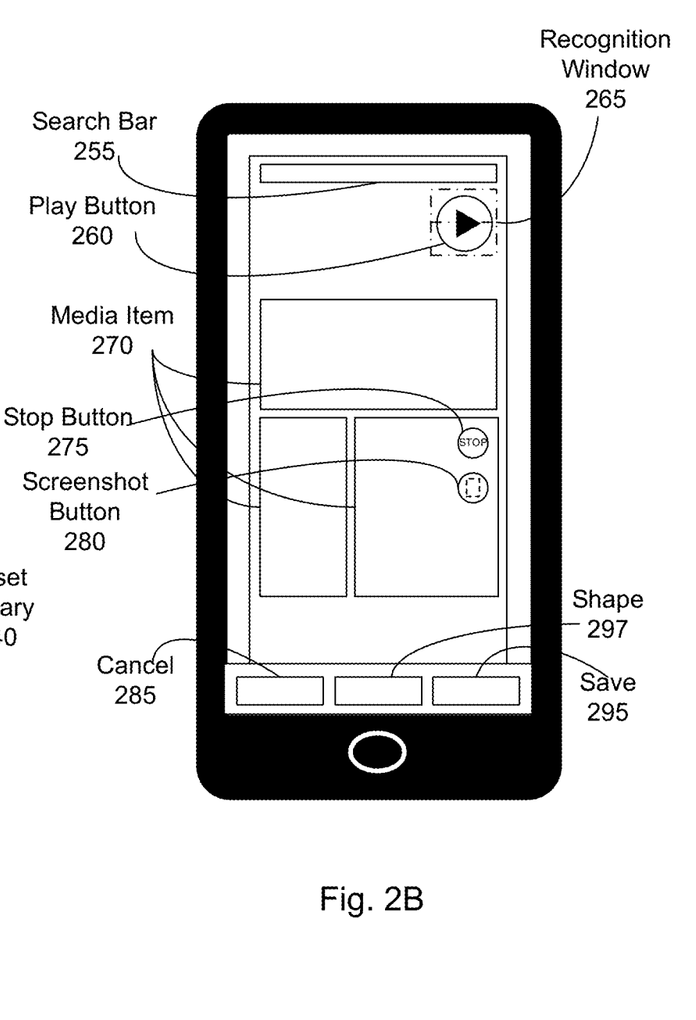
FIG. 2B shows a diagram of a mobile device screen running a script. A mobile device application has been launched in this embodiment.

FIG. 2B shows a diagram of a mobile device screen while a script is running. In the embodiment of FIG. 2B, a media playback application has been launched on the mobile device. The example media playback application presents the user with audio and text content, and allows the user to search for artists, songs, albums, radio stations or other audio content. The media playback application includes a search bar 255, a play button 260, and a plurality of media items 270. While the script is running, the test performance reporting and monitoring system overlays elements on the mobile device screen. These elements include a recognition window 265, a stop button 275, a screenshot button 280, a cancel button 285, and a save button 295.

FIG. 2B displays onscreen elements that are presented to the user by the mobile device application. They are displayed when the test performance monitoring and reporting system is inactive. The search bar 255 includes an editable field in which a user can submit text. The application then creates a list of content in response to the user's request. The play button 260 begins streaming playback of a specific audio file selected in the application by the user. The media items 270 display media content, such as text, images, or video, to users of the mobile device. A media item may be a text box, an advertisement, or an embedded video. The onscreen elements may be selected by the test performance monitoring and reporting system and added as assets to the asset library 240.

The test performance monitoring and reporting system overlays the application presentation on the mobile device screen with elements that assist with the creation and editing of device-specific scripts as well as with recording data about the performance of the device. The recognition window 265, in this embodiment, is configured to surround an onscreen element in order to capture an image that can be converted into an asset and added to the asset library 240. The recognition window 265 may be created by a service that uses optical character recognition, user interface element resource information analysis, or image recognition to bound an onscreen asset candidate. The recognition window 265 in this embodiment is a square, but it may be of an arbitrary shape. FIG. 2B also displays testing interface elements that are not visible to users when the test performance monitoring and reporting system is not active. These elements include the screenshot button 280 and the stop button 275. The screenshot button 280 takes a screenshot of the mobile device's current state. The captured screenshot can be used to debug errors that present themselves when the script is run. The captured screenshot can also be used to update the asset library. The stop button 275 stops the currently-running script and saves results.

FIG. 2B displays image editing elements used for capturing screenshots. These image editing elements include the cancel button 285, the save button 295, and the shape button 297. The cancel button 285 cancels a current image editing process, and returns the user to the scripting menu of FIG. 2A. The save button 295 saves an asset enclosed within a bounding box. In this embodiment, the save button 295 saves an asset corresponding to the play button 260 enclosed within the recognition window 265. The shape button 297 allows the testing user to change the shape of the target area or recognition window around an asset candidate control element. For example, the shape button 297 may change the recognition window 265 from a square recognition window to a circular recognition window because the play button is circular rather than rectangular. The shape button 297 allows control elements to be targeted in a manner that reduces background image noise.

Figure 3:
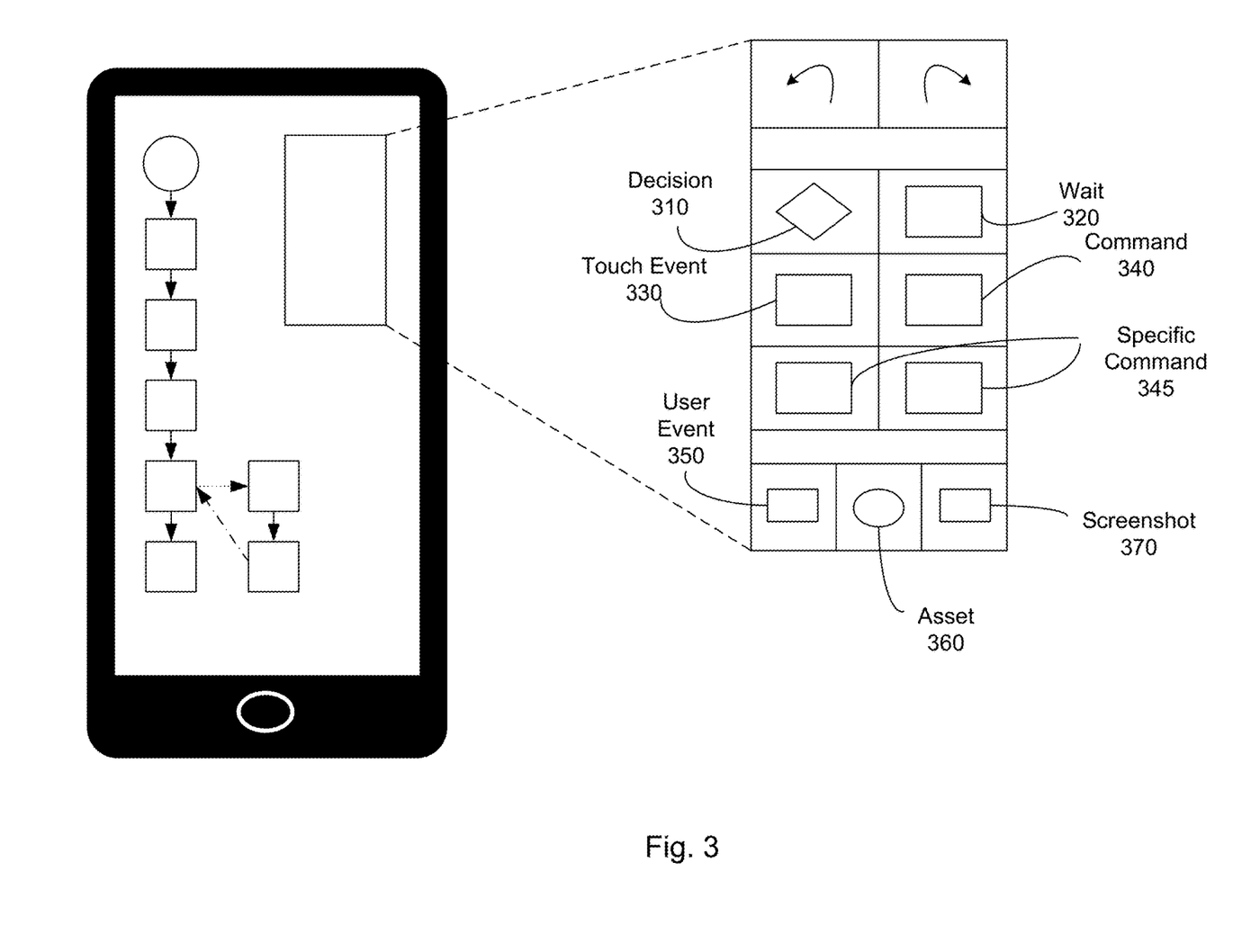
FIG. 3 shows an illustration of a block selection menu.

FIG. 3 shows an illustration of a block selection menu. The embodiment of FIG. 3 shows a set of drag-and-drop blocks including a decision block 310, a wait block 320, a touch event block 330, a command block 340, and a plurality of specific command blocks 345. The embodiment also includes a user event block 350 and an asset block 360, both of which do not add logic blocks to the scripting interface.

The drag-and-drop blocks are sequenced and connected to form the script. The decision block 310 creates a conditional branch node. Multiple types of decision conditions are available for users. For example, a decision block may test to see if a wireless network is connected. In this embodiment, the decision block 310 has one positive and one negative outcome. The wait block 320 tells the mobile device to wait for an action to be completed. The tester can control how much time the script will pause before executing the action designated by the next logic block. The touch event block 330 prompts the user of the mobile device to perform a touch event. Multiple touch event types are supported. These touch event types are designated by the platform running on the device. The types may include, for example, tapping, swiping, and touching with two or more fingers. The duration of the touch can also be changed. The touch event block 330 produces a simulated touch event. When this is done, the coordinates of the asset to be touched are logged and the simulated touch is performed on the device at the location of the logged coordinates. The command block 340 executes an action that a user could normally execute using a command line interface. For example, a command block 340 may be used to launch or force stop an application. In one embodiment, a command block has a field specifying an application and a launch command with an address for that application. Specific command blocks 345 are command blocks with pre-specified fields. For example, specific command blocks may include "Launch GOOGLE® Chrome" or "Launch YOUTUBE®" nodes.

The other blocks assist users with creating device-specific scripts. The user event block 350 plays the script until the last node in the sequence. The user event node allows a user to capture a screenshot of the mobile device's state at any time during the script run. The user event block 350 can be configured to record the set of operations during runtime that result in the user event (e.g., capturing the screenshot without capturing any extraneous navigations or touch actions committed by the user). The asset block 360 loads the asset library for a device under test. The test performance monitoring and reporting system recognizes the hardware device under test and creates a list of assets for that particular device that correspond to the assets in the generic asset library loaded with the script. These assets are created from screenshots taken when the script is executed. The screenshot block 370 captures a screenshot of the current mobile device UI. The captured screenshot may be added as a node within the script. When a connection is made from a script node to the captured screenshot, the captured screenshot is automatically added to the asset library. If the connection is deleted, the screenshot is removed from the asset library. The captured screenshot can also be used to determine a device-specific asset to be added to the asset library. The screenshot is analyzed and a bounding box is created around the device-specific asset. This allows assets to be added to scripts outside of training mode.

Figure 4:
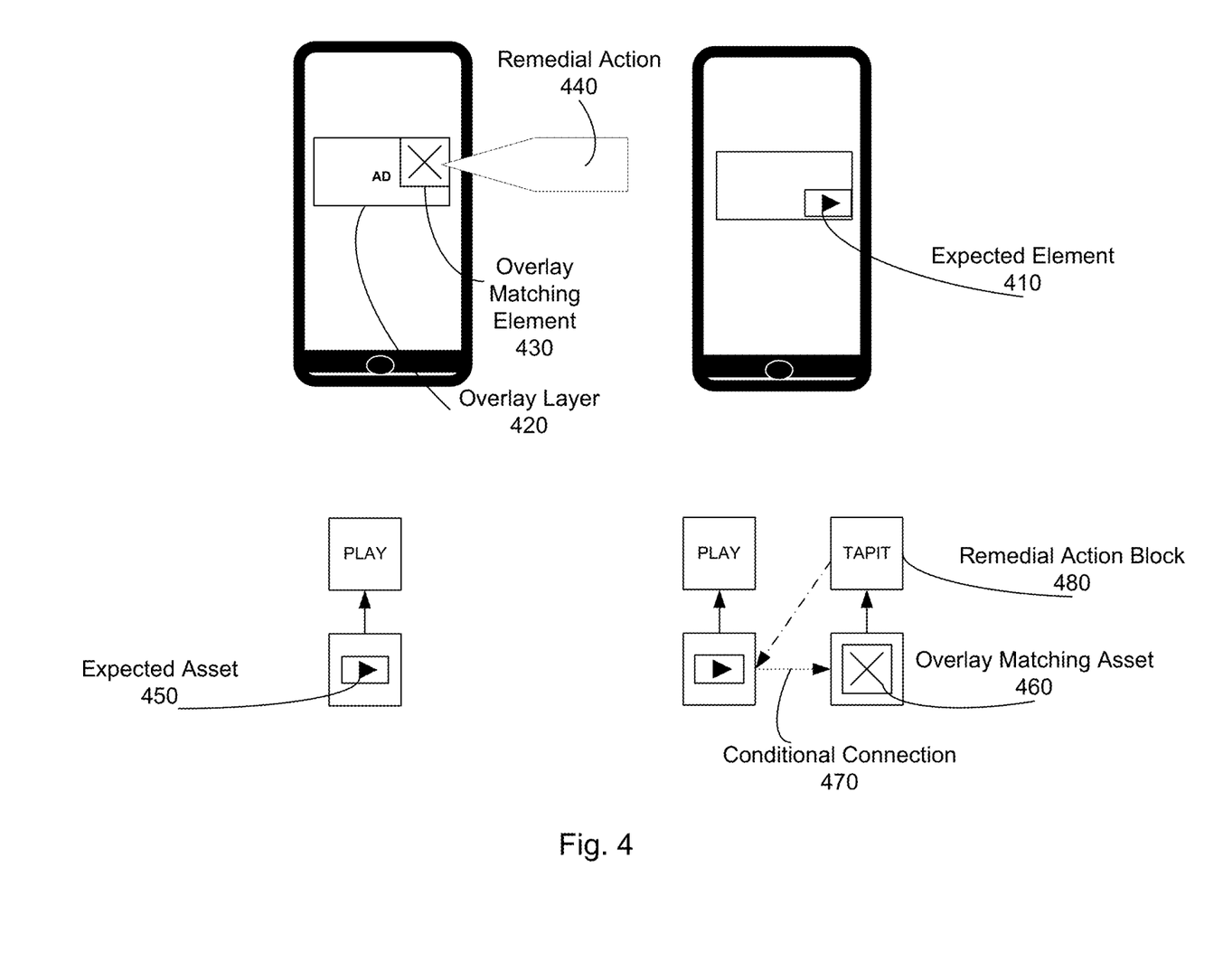
FIG. 4 illustrates a diagram showing how a script adapts when a different type of mobile device is connected or when a different mobile device application version is loaded.

FIG. 4 shows how the test performance monitoring and reporting system accounts for a situation in which an expected onscreen element 410 that needs to have an action performed on it is obscured by an overlay layer 420, such as an advertisement layer. In this case, the overlay layer 420 contains an overlay matching element 430 on which a remedial action 440 is performed, removing the overlay layer 420 and exposing the expected onscreen element 410. For example, the expected onscreen element 410 is a play button on a video, while the overlay layer 420 is an advertisement that obscures the play button. The overlay matching element 430 is an "x"-shaped icon contained within the advertisement that can be touched by a user in order to remove the advertisement, exposing the video and its play button and allowing the play button to be touched.

The expected onscreen element 410 is represented in the test performance monitoring and reporting system by an expected asset 450. The overlay matching element 430 is represented in the test performance monitoring and reporting system by an overlay matching asset 460. The overlay matching asset 460 may be encountered by executing the script until the script reaches the logic block containing the expected asset. In this case, the script fails and provides the testing user with a screenshot that would allow the overlay matching asset 460 to be located. The overlay matching asset 460 may also be encountered in training mode.

In this example, the script instructs the mobile device to perform an action when the expected asset 450 is detected. However, the expected element 410 associated with the expected asset 450 is obscured by the overlay layer 420. The script is modified to include a conditional connection 470 to the overlay matching asset 460 from the logic block containing the expected asset. When the modified script encounters the overlay matching asset 460, it next instructs the mobile device to execute a remedial action block 480, performing the remedial action 440 upon the overlay matching element 430 to remove the overlay layer 420. It then searches again for the element 410 associated with the expected asset 450.

Figure 5:
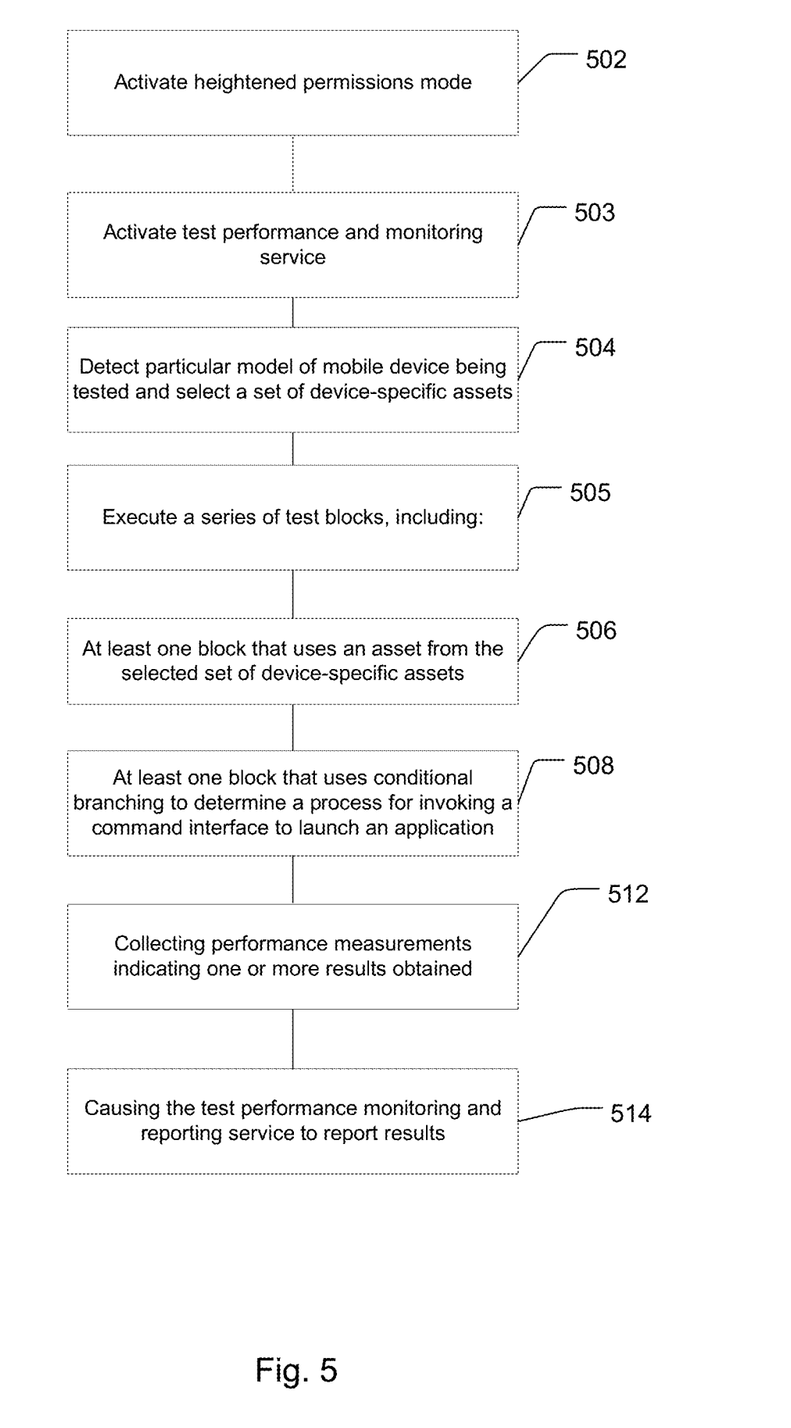
FIG. 5 shows a flow chart showing an example method for creating an adaptive test script for a mobile device.

FIG. 5 shows a flow chart showing an example method for creating an adaptive test script for a mobile device. The script is created using a test performance monitoring and reporting system such as the test performance monitoring and reporting system 170 of FIG. 1C. As discussed above, the initial step 502 includes establishing a connection between the touchscreen device and the remote machine to establish a debugging link and enables HPP on the mobile device.

In step 502, over the connection, an HPP is sent from the remote machine to the touchscreen device. If the USB connection between the remote machine and touchscreen device is disconnected, the HPP continues to be resonant on the device and multiple testing sessions can be conducted on the device. Results from running the script could be reported back to the remote machine, the test controller, or in the memory of the mobile device.

In this example, the debugging link is established using ADB. The connection may be through USB or initially through USB followed by Wi-Fi. Other tools than ADB or future implementations of ADB may allow the connection to be made initially over Wi-Fi, Bluetooth or another wireless channel. Using ADB, a physical security requirement is satisfied by the USB connection.

In a debugging session, elevated permissions are given which allow an HPP application on the mobile device to generate simulated events, such as system touch events normally generated by the stack in response to contact with a touch sensitive display. In another example, system gesture events can be simulated, as if an optical sensor on the mobile device were detecting a control gesture in view of the optical sensor. The event simulation script can run either on the test console in communication with the mobile device or in one or more programs on the mobile device. For instance, the HPP could run the script or another application on the mobile device could run the script and communicate events to the HPP for relay.

In step 503, the test performance monitoring and reporting system is launched on the mobile device. The HPP having been launched on the remote device ensures that scripts created using the test performance monitoring and reporting system can be executed. The test performance monitoring and reporting system allows the user to select one or more types of scripts saved on the mobile device to run or edit. These scripts may be written, for example, to test specific applications running on the mobile device. The test scripts written may be stored on a server to allow them to be downloaded on multiple devices. The test performance monitoring and reporting system may send the user an onscreen notification alerting the user that the mobile device is ready to run scripts.

In step 504, the test performance monitoring and reporting system automatically detects the particular model of the mobile device that is connected. Each particular model is associated with a corresponding asset library. The assets within the asset library may be associated with the mobile device during a training mode that captures screenshots of assets and updates the library by matching elements of the screenshots with corresponding generic assets. This may be done using image recognition techniques. Assets may also be associated with the device while the script is running. During runtime, screenshots are taken after each logic block is executed. If an onscreen element corresponding to a generic asset within the generic asset library is not immediately found in the screenshot, image recognition techniques are used to determine an onscreen element that can be captured as a device-specific asset analogous to the generic asset. This asset is then added to the library. In some embodiments, the test performance monitoring and reporting system scans the entire screenshot in order to look for a device-specific asset to add to the asset library. In other embodiments, the test performance monitoring and reporting system crops the screen to isolate the element before capturing the device-specific asset to add to the library. The test performance monitoring and reporting system may ascertain the correct location because assets exist in similar places on the same application across all devices.

In step 505, the test performance monitoring and reporting system executes a sequence of logical blocks making up the script. Each logic block, or node, in the sequence performs a specific action to change the state of the mobile device. The sequence of logic blocks is deterministic, allowing for test results to be easily replicated for a given set of test inputs. In one implementation, the sequence of logic blocks is expressed as a state machine. Nodes can be added to or removed from the sequence to account for additional test states. The script begins at the start node, and ends at a terminal node. In one embodiment, the terminal node is a node that has only incoming connections In step 506, the test performance monitoring and reporting system executes at least one block that uses an asset from the selected set of device-specific assets. The asset is an image that represents an onscreen element that can be manipulated by a user, such as a play button or a call button. The logic block using the asset directs the script to search for the asset on the mobile device screen. The test performance monitoring and reporting system searches for the asset by either cropping the screen to isolate an area where the asset is expected to be found or scanning the whole screen. When the asset is found, the test performance monitoring and reporting system transitions to the next block in the sequence. The next block performs an action associated with the onscreen element that matches the image shown by the asset. For example, upon locating a play button associated with a play button asset, the test performance monitoring and reporting system next plays a media file.

In step 508, at least one block that uses conditional branching is executed. Conditional branching is employed when a logical block triggers one of a plurality of outcomes in response to different input parameters. In some embodiments, Boolean logic may be used to implement branching. For example, a logic block may be configured to detect whether a wireless network is present. If the network is present, the logic block transfers state to a logic block that requires the network to be present. If the network is not present, the logic block transfers state to a different logic block that does not require a connection to be present. In one embodiment, if a wireless network is not present, the test script directs the user to turn on Wi-Fi and select a wireless network. It then waits for a connection to be established, and then returns to the original block detecting the presence of a wireless connection. Steps 506 and 508 show two types of blocks that can be created using the test performance monitoring and reporting system. However, a user may develop test scripts without using blocks that carry out the operations described in steps 506 and 508.

The test performance monitoring and reporting system can be used to write a script that does not contain conditional branching statements and command interface executions.

In step 512, the test performance monitoring and reporting system collects performance measurements while running the script. These measurements may include screenshots or videos of the script executing. The measurements may also include timestamp information associated with executions of individual logic blocks. The test performance monitoring and reporting system then reports results in step 514. These results can be viewed by accessing a menu within the test performance monitoring and reporting system.

Figure 6:
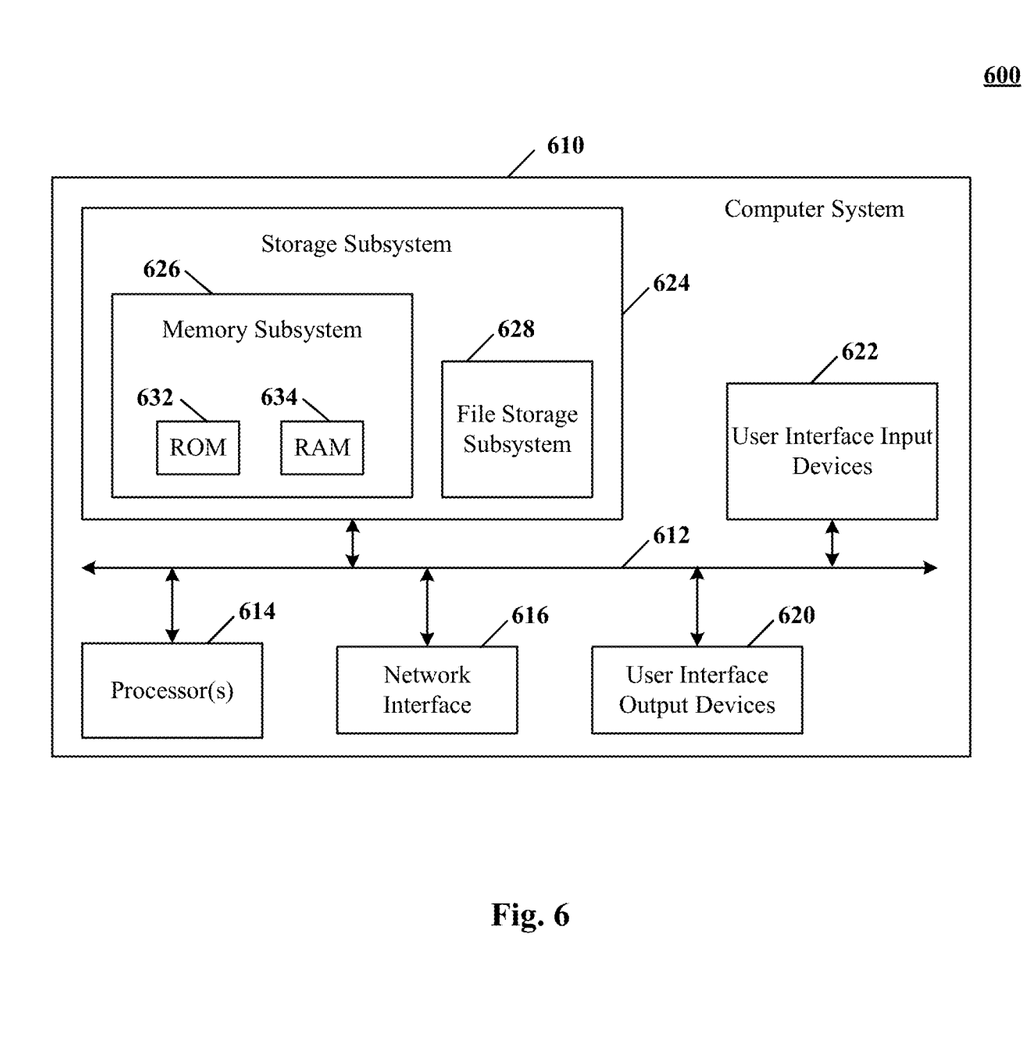
FIG. 6 is a block diagram of an example computer system.

FIG. 6 is a block diagram of an example computer system, according to one implementation. Computer system 610 typically includes at least one processor 614 that communicates with a number of peripheral devices via bus subsystem 612. These peripheral devices may include a storage subsystem 624 including, for example, memory devices and a file storage subsystem, user interface input devices 622, user interface output devices 620, and a network interface subsystem 616. The input and output devices allow user interaction with computer system 610. Network interface subsystem 616 provides an interface to outside networks, including an interface to corresponding interface devices in other computer systems.

User interface input devices 622 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 610.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 610 to the user or to another machine or computer system.

Storage subsystem 624 stores programming and data constructs that provide the ability to perform the required actions of some or all of the components and methods described herein. These software components are generally executed by processor 614 alone or in combination with other processors.

Memory 626 used in the storage subsystem can include a number of memories including a main random-access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The components implementing the required actions of certain implementations may be stored by file storage subsystem 628 in the storage subsystem 624, or in other machines accessible by the processor.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

Particular Implementations

In one implementation, a method is described from the perspective of running a test. The method includes activating a test performance monitoring and reporting system on a mobile device being tested. A particular model of the mobile device being tested is detected. A set of device-specific assets, from a plurality of sets of device-specific assets, is selected to use while testing the particular model detected. The selected set corresponds to the particular model of the mobile device being detected. A set of test logic blocks are executed. At least one block executed uses an asset from the selected set of device-specific assets. At least one block executed is a deterministic logic block that uses conditional branching to determine a process for invoking a command interface to launch an application on the mobile device being tested. Performance measurements indicating one or more results obtained from executing the series of test logic blocks are collected. The test performance monitoring and reporting system reports the one or more results.

An asset is an image of element of an application with which a mobile device user can interact. An asset may be an image of a graphical element that is associated with an application.

In one embodiment, the asset is one type of element from a list of types of elements including application launch buttons, search bars, and call buttons.

A criterion for a logic block in the set to perform an action is whether or not the mobile device is connected to a network. Conditional branching is employed to determine what action is performed in this case. In the presence of a network, the logical block traverses a connection to another specific logic block performing a specific action. In the absence of the network, the logical block traverses a different connection to a different specific logic block performing a different specific action.

An asset can be determined from a captured screenshot. During testing, the test performance monitoring and reporting system takes screenshots. Elements on these screenshots can be selected and converted into assets.

Determining which elements are selected to use as assets involves using optical character recognition, image recognition, or UI element resource information on the captured screenshot.

Logic blocks are sequenced by coupling the blocks. Blocks are coupled using directional arrows. The direction of the arrow used signifies a transition from a first block in a sequence to a second block in a sequence. The state of the system may change following the transition between blocks.

Logic blocks can be added and removed. Connections between other logical blocks to the removed blocks are also removed.

A logic block can instruct a script to wait. The wait time can be designated by a testing user. The waiting action can be performed to allow an application to open or for certain elements to be loaded. A waiting action can also allow an advertisement to play.

A logic block can instruct a test script to change the operational state of a media element on the mobile device screen. A logic block can instruct a script to click to expand a text box, play a video, or pause an audio file.

A logic block can execute an action in response to a type of touch event. Touch events include tapping and swiping the phone. Touch events can be simulated or done manually.

The mobile device used is a production mobile device.

An asset can be determined by scanning a specific portion of a captured screenshot. The specific portion can be determined by visually or algorithmically scanning multiple screenshots in order to determine an expected position for an asset.

Available sets of assets, or asset libraries, are determined when the test performance monitoring and reporting system is launched on the mobile device. If assets present in the script are not found at launch, they can be determined using screenshots.

A logic block can capture a screenshot. The screenshot can be used in order to debug the script itself.

Boolean logic can be employed to create conditional branching decisions. For example, a logical block may access a URL if a Wi-Fi network is present (for example, using the statement "#datanetwork<="wifi"") but will return an error message if the Wi-Fi network is not present.

An asset can be determined by scanning an entire captured screenshot. This is done when it is not certain that there is a location where a screenshot can be expected to be found.

The test performance reporting and measuring system can be trained to find corresponding assets on different mobile devices. A script created for a first type of mobile device may be loaded on a second type of mobile device. The script can then be run until it fails to find an asset present on the second type of mobile device. It can take a screenshot and search for the correct corresponding asset.

Each of the method implementations described from the perspective of a test controller can be practiced as a device. The device includes a processor and tangible memory coupled to the processor. Instructions loaded into the memory, when executed, cause the processor to carry out the actions described above for a testing method. The actions include activating a test performance and monitoring system, detecting a particular model of mobile device, executing logical blocks, collecting performance measurements, and reporting test results.

Computer readable storage media implementations are also disclosed. Examples of tangible storage media are dynamic random-access memory, nonvolatile solid-state memory and rotating memory. Tangible storage media are not intended to include transitory waveforms, whether in free space or on a wire or trace. While the technology disclosed could be practiced as software per se or as software conveyed by transitory waveforms, neither tangible storage media nor tangible computer readable storage media are intended to extend to transitory waveforms.

The technology disclosed can be practiced as a tangible computer readable storage media impressed with instructions that, when executed on appropriate hardware, causes the hardware to carry out any of the methods described above. Alternatively, it can be practiced as a tangible computer readable media impressed with program instructions that, when combined with appropriate hardware, produces any of the devices described above.

While the technology disclosed is by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims.

The invention claimed is:

1. A method of testing mobile devices, comprising:
activating a test system running on a mobile device being tested and that performs performance monitoring and reporting on the mobile device being tested;
detecting a particular model of the mobile device being tested, selecting a set of device-specific assets, from a plurality of sets of device-specific assets, to use while testing the particular model detected, the selected set corresponding to the particular model of the mobile device being detected;
executing a pre-defined series of test logic blocks on the mobile device, the pre-defined series of test logic blocks being defined using graphical blocks corresponding to the selected set of device-specific assets, the execution of the pre-defined series of test logic blocks including:
executing at least one block, of the pre-defined series of test logic blocks, that uses an asset from the selected set of device-specific assets to invoke a specific action on the mobile device using one or more applications on the mobile device, and
executing at least one deterministic logic block, of the pre-defined series of test logic blocks, that uses conditional branching to determine a process for invoking a command interface to launch an application on the mobile device being tested according to an outcome of an execution of a previous block that uses an asset from the selected set of device-specific assets; and
collecting performance measurements indicating one or more results obtained from executing the series of test logic blocks; and
causing the test system to report the one or more results.

2. The method of claim 1, further including the test system capturing a screenshot when the block that uses the asset is executed.

3. The method of claim 1, wherein the asset is an image of a control element of an application with which a mobile device user interacts.

4. The method of claim 3, wherein the asset is an image of one control element from a list of control elements including application launch buttons, search bars, and call buttons.

5. The method of claim 3, wherein the asset is collected by capturing a screenshot of the mobile device.

6. The method of claim 5, wherein collecting the asset uses one method of analysis selected from a group containing optical character recognition, image recognition, and user interface element resource information analysis on the captured screenshot.

7. The method of claim 5, wherein the asset is collected by cropping the screenshot and scanning the cropped screenshot.

8. The method of claim 1, wherein conditional branching allows an action to be performed when a network is connected and a different action to be performed when the network is not connected.

9. The method of claim 1, wherein logic blocks are sequenced by coupling the logic blocks using directional elements.

10. The method of claim 1, wherein logic blocks are added and removed.

11. The method of claim 1, wherein a logic block instructs a test script to wait.

12. The method of claim 1, wherein a logic block instructs a test script to modify playback of a media element.

13. The method of claim 1, wherein a logic block executes an action in response to a type of touch event, wherein the types of touch event include tapping and swiping.

14. The method of claim 1, wherein the mobile device is a production mobile device.

15. The method of claim 1, wherein an asset block determines the set of device-specific assets for the particular model of the mobile device.

16. The method of claim 1, wherein a logic block captures a screenshot.

17. The method of claim 1, wherein conditional branching is performed using Boolean logic.

18. The method of claim 1, wherein the test system uses a training mode to execute a logic block associated with each asset within a generic set of assets, capture a screenshot after executing each logic block, and replace each generic asset with a collected device-specific asset to create a device-specific set of assets.

19. A system including one or more processors coupled to memory, the memory loaded with computer instructions to test mobile devices, the instructions, when executed on the processors, implement actions comprising:
- activating a test system running on a mobile device being tested and that performs monitoring and reporting on the mobile device being tested;
- detecting a particular model of the mobile device being tested and selecting a set of device-specific assets, from multiple available sets, to use while testing the particular model detected;
- executing a pre-defined series of test logic blocks on the mobile device, the pre-defined series of test logic blocks being defined using graphical blocks corresponding to the selected set of device-specific assets, the execution of the pre-defined series of test logic blocks including
  - executing at least one block, of the pre-defined series of test logic blocks, that uses an asset from the set of device-specific assets to invoke a specific action on the mobile device using one or more applications on the mobile device,
  - executing at least one deterministic logic block, of the pre-defined series of test logic blocks, that uses conditional branching to determine a process for invoking a command interface to launch an application on the mobile device being tested according to an outcome of an execution of a previous block that uses an assed from the selected set of device-specific assets, and
  - executing at least one block that replays a sequence of command interface interactions recorded from a test user interaction with the particular model of the mobile device; and
- collecting performance measurements indicating one or more results obtained from executing the series of test logic blocks; and
- causing the test system to report test results.

20. A non-transitory computer readable storage medium impressed with computer program instructions to test mobile devices, the instructions, when executed on a processor, implement a method comprising:
- activating a test system that performs monitoring and reporting on a mobile device being tested;
- detecting a particular model of the mobile device being tested and selecting a set of device-specific assets, from multiple available sets, to use while testing the particular model detected;
- executing a pre-defined series of test logic blocks on the mobile device, the pre-defined series of test logic blocks being defined using graphical blocks corresponding to the selected set of device-specific assets, the execution of the pre-defined series of test logic blocks including
  - executing at least one block, of the pre-defined series of test logic blocks, that uses an asset from the set of device-specific assets to invoke a specific action on the mobile device using one or more applications on the mobile device,
  - executing at least one deterministic logic block, of the pre-defined series of test logic blocks, that uses conditional branching to determine a process for invoking a command interface to launch an application on the device being tested according to an outcome of an execution of a previous block that uses an asset from the selected set of device-specific assets, and
  - executing at least one block that replays a sequence of command interface interactions recorded from a test user interaction with the particular model of the mobile device; and
- collecting performance measurements indicating one or more results obtained from executing the series of test logic blocks; and
- causing the test system to report test results.

* * * * *